United States Patent [19]
Hirata et al.

[11] Patent Number: 5,473,528
[45] Date of Patent: Dec. 5, 1995

[54] PARALLEL CONNECTION OF DIFFERENT TYPES OF AC POWER SUPPLIES OF DIFFERING CAPACITIES

[75] Inventors: Akio Hirata; Yoshiaki Miyazawa, both of Tokyo, Japan

[73] Assignee: Kabushiki Kaisha Toshiba, Tokyo, Japan

[21] Appl. No.: 365,317

[22] Filed: Dec. 28, 1994

Related U.S. Application Data

[63] Continuation of Ser. No. 946,589, Sep. 18, 1992, abandoned.

[30] Foreign Application Priority Data

Sep. 18, 1991 [JP] Japan .................................. 3-236688
Sep. 18, 1991 [JP] Japan .................................. 3-236689

[51] Int. Cl.⁶ .............................................. H02M 7/5395
[52] U.S. Cl. ........................................ 363/71; 307/66
[58] Field of Search ................ 363/41, 71; 307/23.2, 307/2.66

[56] References Cited

U.S. PATENT DOCUMENTS

| | | | |
|---|---|---|---|
| 4,677,535 | 6/1987 | Kawabata et al. | 363/71 |
| 4,733,341 | 3/1988 | Miyazawa | 363/71 |
| 5,212,630 | 5/1993 | Yamamoto et al. | 363/71 |

FOREIGN PATENT DOCUMENTS

| | | | |
|---|---|---|---|
| 52-73326 | 6/1977 | Japan | 363/71 |
| 52-74825 | 6/1977 | Japan | 363/71 |
| 56-88676 | 7/1981 | Japan | 363/71 |

*Primary Examiner*—Jeffrey L. Sterrett
*Attorney, Agent, or Firm*—Oblon, Spivak, McClelland, Maier & Neustadt

[57] ABSTRACT

A power inverting method and system for connecting a plurality of AC power supplies to a common bus line in parallel wherein the AC power supplies are independently controlled so that power supplies with different rating characteristics can be coupled to the common bus line without adverse effects such as the existence of cross currents flowing between the different power supplies. In each AC power supply there is provided a system parameter calculating unit for calculating optimum load current, system impedance and output voltage parameters of the power supply which are then output to a reference data producing unit which generates appropriate feedback voltage and phase signals for output to a voltage controller and a phase synchronization controller, respectively. The voltage controller and phase synchronization controller output feedback signals to a power inverter which varies the power supply output. Using such feedback control in each of the plurality of power supply units enables a constant current to be output to a load on the system and eliminates the possibility of cross currents between the various power supply units.

13 Claims, 6 Drawing Sheets

OPERATION FLOW OF SYSTEM PARAMETER CALCULATING UNIT 121

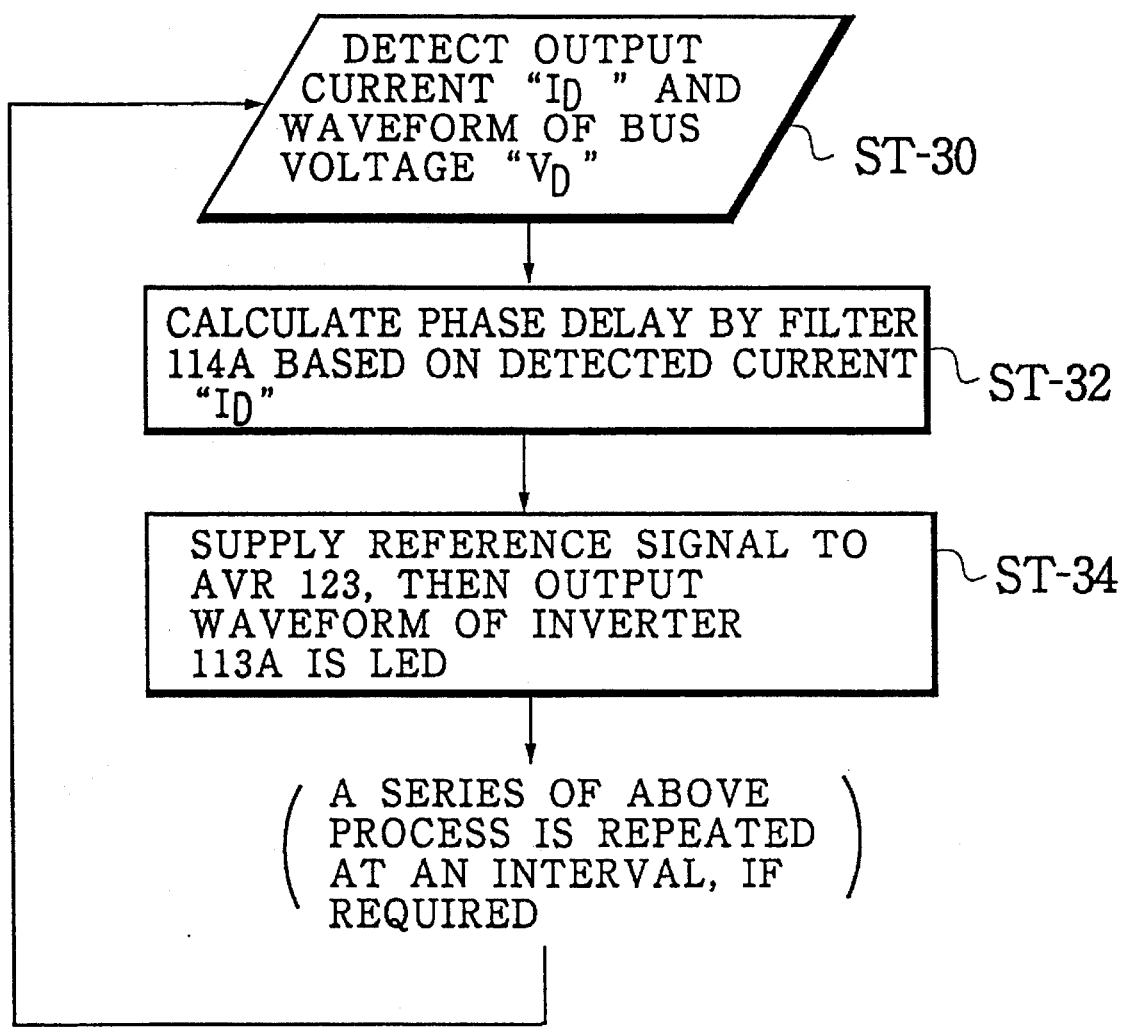

PARALLEL CONNECTION OF DIFFERENT TYPES OF AC POWER SUPPLIES OF DIFFERING CAPACITIES

This application is a Continuation of application Ser. No. 07/946,589, filed on Sep. 18, 1992, now abandoned.

BACKGROUND OF THE INVENTION

1. Field of the Invention

The present invention generally relates to a power inverting method and a system capable of parallel-connecting different types of a.c. power supplies having different capacities to a common bus line. More specifically, the present invention is directed to a power inverting method and system wherein a plurality of uninterruptible power supplies are independently connected in parallel with the common bus line (load).

2. Description of the Prior Art

As highly reliable power supplies used for a computer system or the like, a so-called "Uninterruptible Power Supply (simply referred to as an UPS)" has been widely utilized. The UPS is capable of stably supplying AC power to such a specific load, e.g., a computer system, by employing a battery unit even under such difficult conditions that a supply of AC power from an AC power source is interrupted, or an AC output voltage of the AC power source is instantaneously lowered. In particular, very recently, a large-scaled power supply system for driving a plurality of UPS devices in a parallel mode is required in order to accept demands to increase power capacities and also to improve power supply reliabilities, required by a large-scaled electronic system such as an on-line communication network.

A parallel driving technique for a plurality of UPS, or power inverting units is known in the art where either a shortage of power capacity in a bus line happens to occur, or reliabilities on the power supply from the bus line to the load are increased.

Such a parallel driving technique of the plural power inverters has been described in, for instance, Japanese patent publication No. 58-46955 published on Oct. 19, 1983, and granted under number of 1215332.

However, when the outputs of the power inverting units (e.g., power inverters) are connected to the bus line, and driven in the parallel mode so as to increase the total power supply capacity of the bus line to the loads, the above-described conventional power supply systems have the following problems:

(1) Among the respective power inverting units, the control signals are necessarily required to be mutually communicated. This implies that these power inverting units cannot be independently driven, or controlled. As a result, the troubles such as malfunction of one power inverting unit may adversely influence operations of the other power inverting units. Then, even when "N" power inverting units ("N" being an integer, more than 2) are driven in the parallel mode on the single bus line, the total power capacity of this bus line cannot become "N" times greater than a total power capacity of a single power inverting unit, but may become smaller than "N" times. Furthermore, higher power-supply reliability of the parallel-driven power inverting system cannot be expected.

(2) Since each of these power inverting units is controlled in such a manner that both active power and reactive power must be equally outputted therefrom, in principle, only power inverting units having identical rated voltage/current and power-supply characteristics can be driven in the parallel mode.

(3) When one or more power inverting units are additionally employed in the present parallel-driven power inverting system in order to solve a shortage of output power of this power inverting system, due to a heavy load, the following problems may additionally occur:

3A) Since there is a limitation in the various conditions for the parallel-driven power inverting units as described in the above item (2), it is originally required to establish a design policy capable of accepting an expansion of power supply capability. However, nowadays, it is practically very difficult to establish such a future power-supply scheme, taking account of drastic changes in the technology. Eventually, it will be impossible without the provision of a separate power inverting system.

3B) Even when one or more power inverting units can be additionally provided with the original bus line, the control signals of the additional power inverting units must be communicated with the presently driven power inverting units, because of the restriction item (1). There are other limitations in time periods and timings of installation constructions.

The present invention has been made in an attempt to solve the above-described problems, and therefore has a primary object to provide such a flexible power inverting system that no control signal is mutually communicated among a plurality of power inverting units driven in a parallel mode, and also no restriction is required in characteristics/rating data of these power inverting units.

A secondary object of the present invention is to provide a power inverting system capable of driving plural power inverting units in a parallel mode without any limitations in power capacities or voltage waveforms of a bus line.

SUMMARY OF THE INVENTION

To achieve the above-described objects and other features of the present invention, a power inverting method capable of parallel-connecting a plurality of power supply units (2A:2B) to a common bus line (13), comprises the steps of:

changing an AC (alternating current) output voltage of a power inverter (13A) employed in one power supply unit (2A);

detecting a first variation in an AC output current of said one power supply unit (2A) when the AC output voltage of said power inverter (2A) is changed;

processing said first variation in the AC output current to infer a desirable parameter (eK, X, IL) required to share AC power which should be derived from said one power supply unit (2A) with respect to total output power capable of being supplied from said common bus line (13) to a load (12); and controlling said one power supply unit (2A) to output a desirable voltage in response to said desirable parameter, whereby said power sharing operation for said one power supply unit (2A) is achieved independently of other power sharing operations for other power supply units (3A).

Also, another power inverting method capable of parallel-connecting a plurality of power supply units (3A:3B) to a common bus line (13), comprises the steps of:

detecting both an amplitude of an AC voltage actually appearing on the common bus line (13) and a waveform of said AC voltage to produce a first detection signal;

detecting an AC output current of a power inverter (113A) employed in one power supply unit (3A) to produce a second detection signal;

correcting said first detection signal of the bus line (13) on the basis of said second detection signal of said one power supply unit (3A) to obtain a reference signal; and controlling both a phase and an AC output voltage of said power inverter (113A) in response to said reference signal in order to prevent a cross current flowing through said plurality of power supply units (3A:3B) commonly connected to the bus line (13).

Furthermore, according to another aspect of the present invention, a power inverting system (100) comprises:

a plurality of power supply units (2A:2B) each having a respective inverter (13A) parallel-connected to a common bus line (13);

means (111A) for detecting a variation in an AC output current of one power supply unit (2A) when a command for changing an AC output voltage and a phase of the power inverter (13A) of said one power supply unit (2A) is issued;

means (121:122) for processing said variation in the AC output current to infer a desirable parameter (eX:X:IL) required to share AC power which should be derived from said one power supply unit (2A) with respect to total power output capable of being supplied from said common bus line (13) to a load (12); and means (123:124) for controlling said one power supply unit (2A) to output a desirable voltage in response to said desirable parameter (eX:X:IL), whereby said power sharing operation for said one power supply unit (2A) is achieved independently of other power sharing operations for other power supply units (3A).

Moreover, according to a further aspect of the present invention, a power inverting system (200) comprises:

a plurality of power supply units (3A:3B) each having a power inverter (113A) and being parallel-connected to a common bus line (13);

first detecting means (120) for detecting both an amplitude of an AC voltage actually appearing on the common bus line (13) and a waveform of said AC voltage to produce a first detection signal;

second detecting means (111A) for detecting an AC output current of said power inverter (113A) to produce a second detection signal;

means (125) for correcting said first detection signal of the bus line (13) based on said second detection signal of said one power supply unit (3A) to obtain a reference signal; and means (123:124) for controlling both a phase and an AC output voltage of said power inverter (113A) in response to said reference signal in order to prevent a cross current from flowing through said plurality of power supply units (3A:3B) commonly connected to the bus line (13).

BRIEF DESCRIPTION OF THE DRAWINGS

For a better understanding of the present invention, reference is made of the following descriptions in conjunction with the accompanying drawings, in which:

FIG. 7 is a flow chart for explaining the process operation of the reference signal producing unit 125 employed in the second power inverting system 200.

DETAILED DESCRIPTION OF THE PREFERRED EMBODIMENTS

Figure 1:
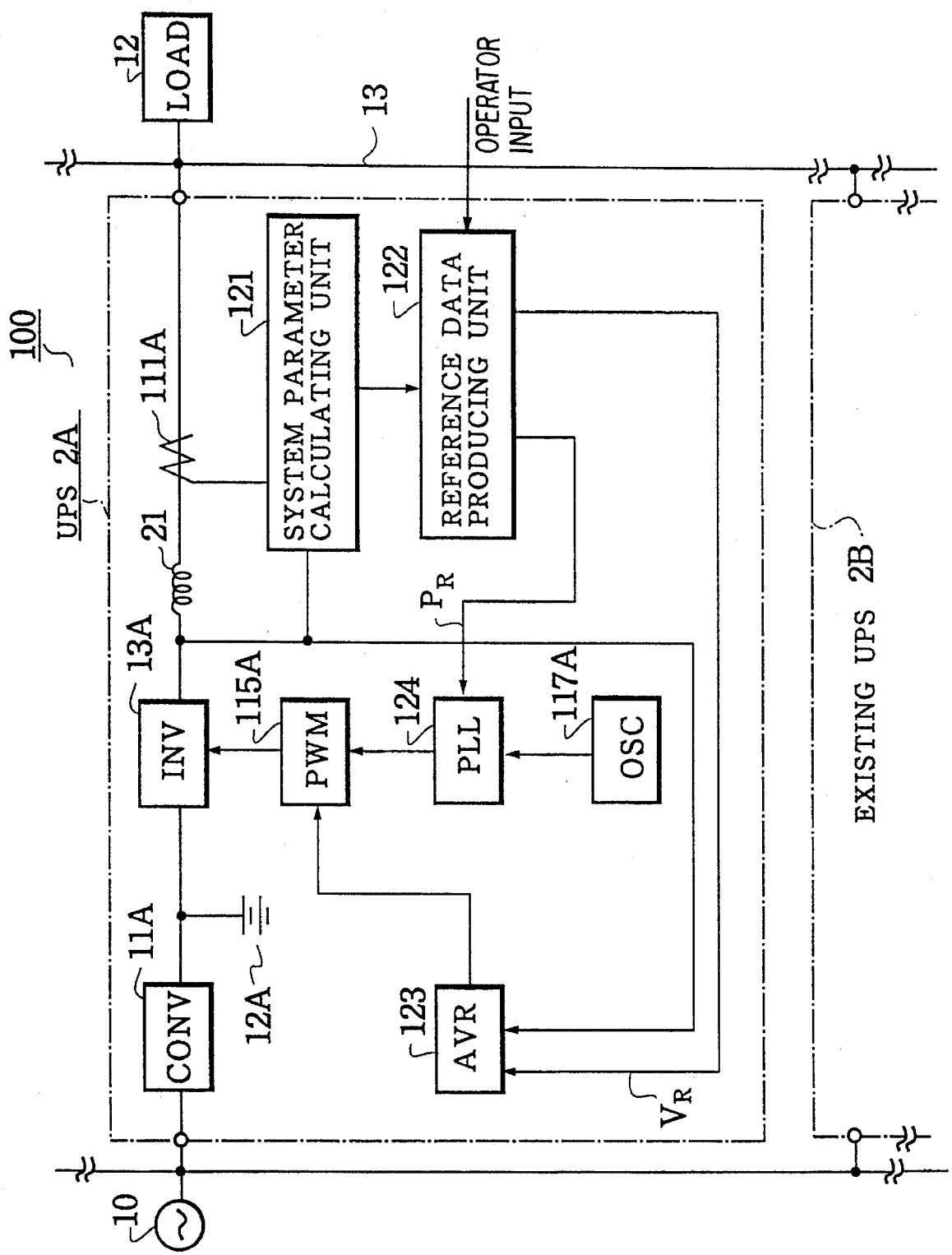
FIG. 1 is a schematic block diagram for showing an arrangement of a power inverting system 100 according to a first preferred embodiment of the present invention.

Before describing various preferred embodiments of the present invention, basic ideas according to the present invention will be summarized.

To achieve the above-described primary object, a first power inverting system is realized by employing a parameter inferring means and a control means based upon the first basic idea. The parameter inferring means infers various parameters of a bus line to which a plurality of power inverting units (UPS) are parallel-connected (i.e., interconnected) based upon variations in output currents of one power inverting unit when either output voltages, or output phases of this power inverting unit are demanded to be changed. Subsequently, the control means controls the output voltage and/or the output phase of this power inverting unit in accordance with the inferred parameters in such a manner that properly shared power can be outputted from this power inverting unit, taking account of the rated data of this power inverting unit. Namely, optimum control parameters can be produced from the parameter inferring means.

In such a first power inverting system of the first basic idea, the optimum control parameters used to control the output voltage/phase of the power inverting unit can be inferred from the variation data of the output currents derived from the power inverting unit when the output voltage/phase thereof are intentionally changed by an operator. As a consequence, the first power inverting system can be continuously controlled, while learning the optimum control condition only for the own power inverting system.

Also, to achieve the above-explained secondary object, a second power inverting system is accomplished by employing a detecting means for detecting either an actual voltage waveform of a bus line, or both the voltage waveform and a phase thereof, and a control means for controlling a waveform and/or a phase of a voltage outputted from a power inverting unit in such a control manner that a predetermined relationship can be established between the detecting signal of the detecting means and the controlled waveform and/or phase.

In the second power inverting system according to the second basic idea, reference signals with regard to the phase and amplitude of the output voltage are produced from the reference voltage detector and the reference output controller in relation to the voltage appearing on the bus line. In response to the reference signals, both the phase and the amplitude of the voltage outputted from the power inverting unit are controlled by the synchronization controller (PLL) and the voltage controller (AVR).

To the contrary, in the conventional power inverting system, the reference voltage value is produced in order that, for instance, the waveform of the output voltage can be resembled with a non-distorted sine waveform. Then, the voltage controller controls the waveform/phase of the output voltage by comparing this reference voltage value with the detected output voltage value. As a consequence, if the waveform (namely, the non-distorted sine waveform) of the voltage outputted from the conventional power inverting system is different from the actual waveform of the voltage appearing on the bus line, a cross current may flow among the plural power inverting units parallel-driven on this bus line due to an instantaneous voltage difference.

However, according to the second power inverting system of the second basic idea, such a conventional cross current problem is eliminated. That is, since the waveform of the voltage outputted from the second power inverting system is controlled in relation to the actual voltage waveform of the bus line, no cross current flows through the parallel-driven power inverting units.

ARRANGEMENT OF FIRST POWER INVERTING SYSTEM

In FIG. 1, there is shown an arrangement of a power inverting system 100 according to a first preferred embodiment of the present invention, which has been accomplished based upon the above-described first basic idea.

As apparent from the entire circuit arrangement of FIG. 1, a single power inverting unit (uninterrupted power supply) 2A is additionally connected to a bus line 13 in parallel with an existing UPS 2B in the first power inverting system 100 so as to supply power to a load 12 via this bus line 13. This power inverting unit 2A is driven in a parallel mode with the existing UPS 2B and can be independently controlled when the power required for the load 12 is supplied therefrom.

In the first power inverting system 100, the power inverting unit (UPS) 2A is connected to an AC input power source 10 and to the parallel-output bus line 13 in order to supply predetermined AC power to the load 12. AC power from the AC input power source 10 is first converted into DC power by a converter 11A. The DC power is further inverted into AC power by an inverter 13A. This DC power is also used to recharge a battery 12A employed in this UPS 2A. The inverted AC power is supplied via an interconnection impedance 21 and the parallel-output bus line 13 to the load 12.

Furthermore, an oscillator 117A is employed to oscillate a signal. This signal is supplied to a phase synchronization controller (PLL) 124. This phase synchronization controller 124 has such a function that the phase of the AC voltage outputted from the inverter 13A is corrected to be coincident with a reference phase given from a reference data producing unit 122 via a gate signal generator 115A (will be discussed in detail). The gate signal generator 115A is constructed of a pulse width modulation (PWM) controller so that the pulse width of the inverter 13A is controllable in response to this gate signal.

On the other hand, a current transformer 111A is connected to the output terminal of this UPS 2A so as to detect an AC output current flowing from the inverter 13A via the interconnection impedance 21 to the bus line 13. A system parameter calculating unit 121 is additionally provided which is connected to the current transformer 111A, a junction between the inverter 18A and the interconnection impedance 21, and also the reference data producing unit 122. The system parameter calculating unit 121 calculates and infers various parameters for the voltage, phase, impedance and the like of the system based upon variations (namely, active current components and reactive current components) in the AC output currents detected by the current transformer 111A. These current variations occur when the AC output voltage and/or the AC output phase of the inverter 13A are changed in response to changing commands given to a voltage controller (AVR) 123 and the phase synchronization controller (PLL) 124 (will be described more in detail). The voltage controller (AVR) 123 has two input terminals for receiving the abovedescribed changing command and the reference voltage data from the reference data producing unit, and the AC output voltage derived from the inverter 13A, respectively, and also one output terminal for supplying a voltage control signal to the gate signal generator (PWM) 115A.

Accordingly, based upon the system parameters calculated/inferred by the system parameter calculating unit 121, the optimum output voltage/phase control data are produced as reference output voltage data "$V_R$" and reference output phase data "$P_R$" from the reference data producing unit 122. Thereafter, the reference output voltage data "$V_R$" is furnished to the voltage controller (AVR) 123, so that the AC output voltage of the inverter 13A is controlled to be fitted to a "reference voltage" derived from the voltage controller (AVR) 123. On the other hand, the reference output phase data "$P_R$" is supplied to the phase synchronization controller (PLL) 124, so that the AC output phase of the inverter 13A is controlled to be fitted to a "reference phase" derived from the phase synchronization controller (PLL) 124.

OVERALL OPERATION OF FIRST POWER INVERTING SYSTEM

An overall operation of the first power inverting system 100 with the above-described circuit arrangement will now be described.

Figure 2:
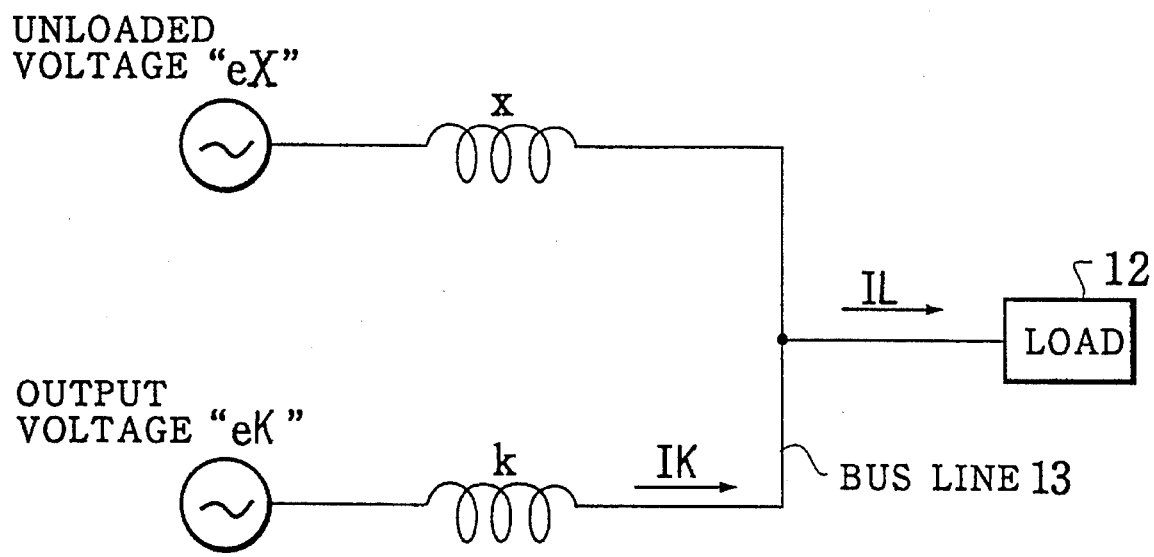
FIG. 2 shows an equivalent circuit of the first power inverting system 100 indicated in FIG. 1.

For a better understanding of the operation of the first power inverting system 100, a description is first made of an equivalent circuit involving the system parameters, as shown in FIG. 2. In the equivalent circuit of FIG. 2, symbol "eK" indicates an output voltage of the inverter 13A; symbol "eX" represents an output terminal voltage of the power supplying system 100 under no load (namely, the output voltage when the load is zero); symbol "K38 is an impedance of an interconnection impedance 21; symbol "X" denotes an impedance of the power supplying system 100; symbol "IK" indicates an output current of the UPS 2A; and symbol "IL" represents a load current through the load 12 of the power supplying system 100. It should be noted that these voltages and currents are vectors having amplitudes and phases. Furthermore, symbols "eX", "X", and "IL" correspond to unknown parameters, whereas the remaining symbols "eK", "K", "IK" are the parameters specific to the UPS 2A, or the-detectable parameters.

Assuming now that when three different commands for changing the output voltage "eK" of the inverter 13A are inputted to the voltage controller 123 from the reference data producing unit 122 by an operator, namely generating respective first, second and third output voltages; "eK1", "eK2" and "eK3", the output current "IK" from the UPS 2A is changed into, respectively, "IK1", "IK2", and "IK3" (i.e., learning control method). The variations in the output current "IK" of the inverter 13A are detected via the current transformer 111A by the system parameter calculating unit 121.

Also, assuming that there is substantially no change in the voltage appearing on the parallel-output bus line 13 in the above-explained three different conditions (eK1, eK2, eK3), the load current "IL" becomes constant in each of the different conditions. Accordingly, the following three equations are obtained:

$$(eK1-eX)/(K+X)=IK1=IL \quad (1)$$

$$(eK2-eX)/(K+X)=IK2-IL \quad (2)$$

$$(eK3-eX)/(K+X)=IK3-IL \quad (3)$$

The above-described unknown parameters "eX", "X" and "IL" can be obtained by solving these three equations (simultaneous equations).

If only the amplitude of the output voltage "eK" is changed, the above-described simultaneous equations are solved based upon only amounts corresponding to the reactive current components, so that unknown parameters corresponding to the reactive current components can be obtained.

Similarly, variations in the output current "IK" of the UPS 2A which occur when different commands for changing the output phase of the inverter 13A are given by the operator to the phase synchronization controller (PLL) 124, are detected via the current transformer 111A by the system parameter calculating unit 121. Thereafter, the above simultaneous equations are solved based upon the detected phase variations, so that parameters corresponding to the active current components are obtained. As a result, the unknown parameters "eX", "X" and "IL" of the system can be calculated/inferred by the system parameter calculating unit 121. Based upon these inferred parameters, the optimum controlling parameters for the output voltage/current of the UPS 2A are produced from the reference data producing unit 122. The system parameter calculating unit 121 can be implemented as a microprocessor unit which includes an analog-to-digital converter for receiving the varying voltage output signals from inverter 13A and then detecting changes in the output as the different operator commands are received by the reference data producing unit 122. The reference data producing unit 122 includes a digital-to-analog converter in order to convert the changing digital output of system parameter calculating unit 121 into varying analog output signals representing the reference phase and voltage signals to be received by the phase synchronization controller 124 and the voltage control unit 123, respectively. Alternatively, the D/A converter may be included in the system parameter calculating unit 121. The voltage controller 123 can be any conventional variable output device for increasing or decreasing a voltage signal in response to changing inputs.

Normally speaking, since the capacity of the system has a relationship with the system impedance "X", the load shares between the power supplying system and the UPS 2A are determined based on the value of this system impedance "X", and furthermore the power to be supplied from the UPS 2A can be set by the inferred parameter of the load current "IL". In other words, the optimum controlling parameters for the output voltage and the output phase are furnished as the reference control data from the reference data producing unit 122 to both the voltage controller 123 and the phase synchronization controller 124, by which the load sharing between the power supplying system and the UPS 2A, and the power to be outputted from the UPS 2A are controlled in conformity to the levels defined by the rated values of this UPS 2A. Accordingly, both the output voltage and the output phase of the UPS 2A can be controlled under optimum conditions. Moreover, if the above-described optimum controlling operation is repeated at a preselected time interval, an optimum controlling operation for continuously following variations in the parameters of the power supplying system, may be achieved.

DETAILED OPERATIONS OF SYSTEM PARAMETER CALCULATING UNIT 121/REFERENCE DATA PRODUCING UNIT 122

Referring now to flow charts shown in FIGS. 3 and 4, a detailed description will be made of the operations of the above-described system parameter calculating unit 121 and reference data producing unit 122, which constitute a major feature of the first power inverting system 100.

Figure 3:
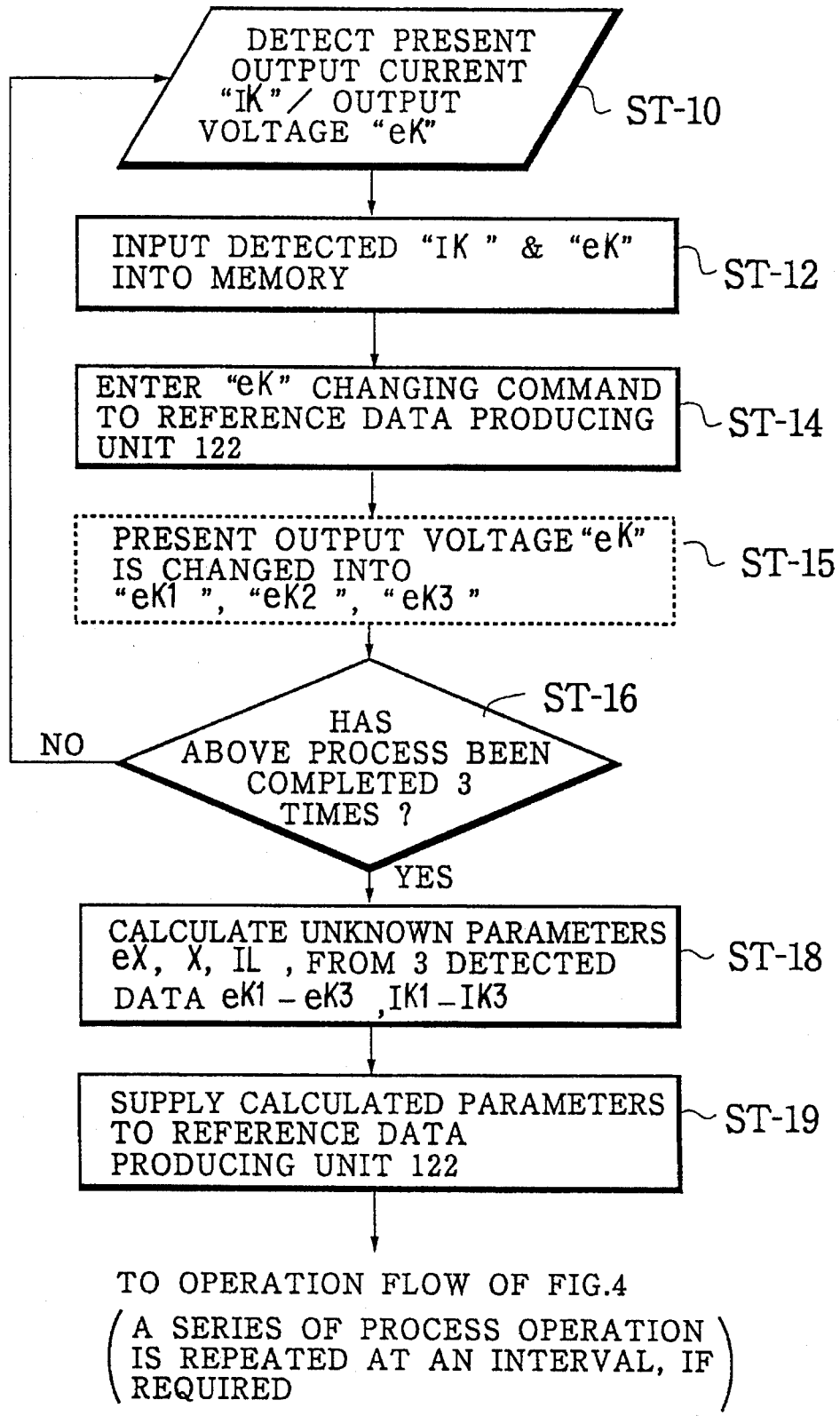
FIG. 3 is a flow chart for explaining operation of the system parameter calculating unit 121 employed in the first power inverting system 100.

FIG. 3 is a flow chart for representing a process operation of the system parameter calculating unit 121.

At a first step ST-10, both a present output current "IK" of the inverter 13A and a present output voltage "eK" thereof are detected via the current transformer 111A by the system parameter calculating unit 121. Then, the detected output current "IK"/voltage "eK" are inputted into a memory (not shown in detail) of this system parameter calculating unit 121 at the next step ST-12. At a step ST-14, the command for changing the output voltage "eK" is entered by an operator into the reference data producing unit 122. As a result, the present output voltage "eK" of the inverter 13A is changed into, for instance, the first output voltage "eK1" at a step ST-15 (i.e., a first changed output voltage "eK1").

At the subsequent step ST-16, a check is made as to whether or not the above-described voltage changing process has been completed 3 times (namely, a third changed output voltage "eK3" has been detected). If N0, then the process operation is returned to the first step ST-12, so that the voltage changing process (i.e., learning control method) is continued until the third changed voltage "eK3" is detected.

Similarly, three different output currents IK1, IK2, IK3 are detected while the output voltage eK is stepwise changed.

To the contrary, if YES, then the process operation is advanced to step ST-18. At this step ST-18, the above-explained solving of the simultaneous equations (1) to (3) is carried out based upon the three sets of "IK" and "eK" (namely, IK1, IK2, IK3 and eK1, eK3, eK3).

Figure 4:
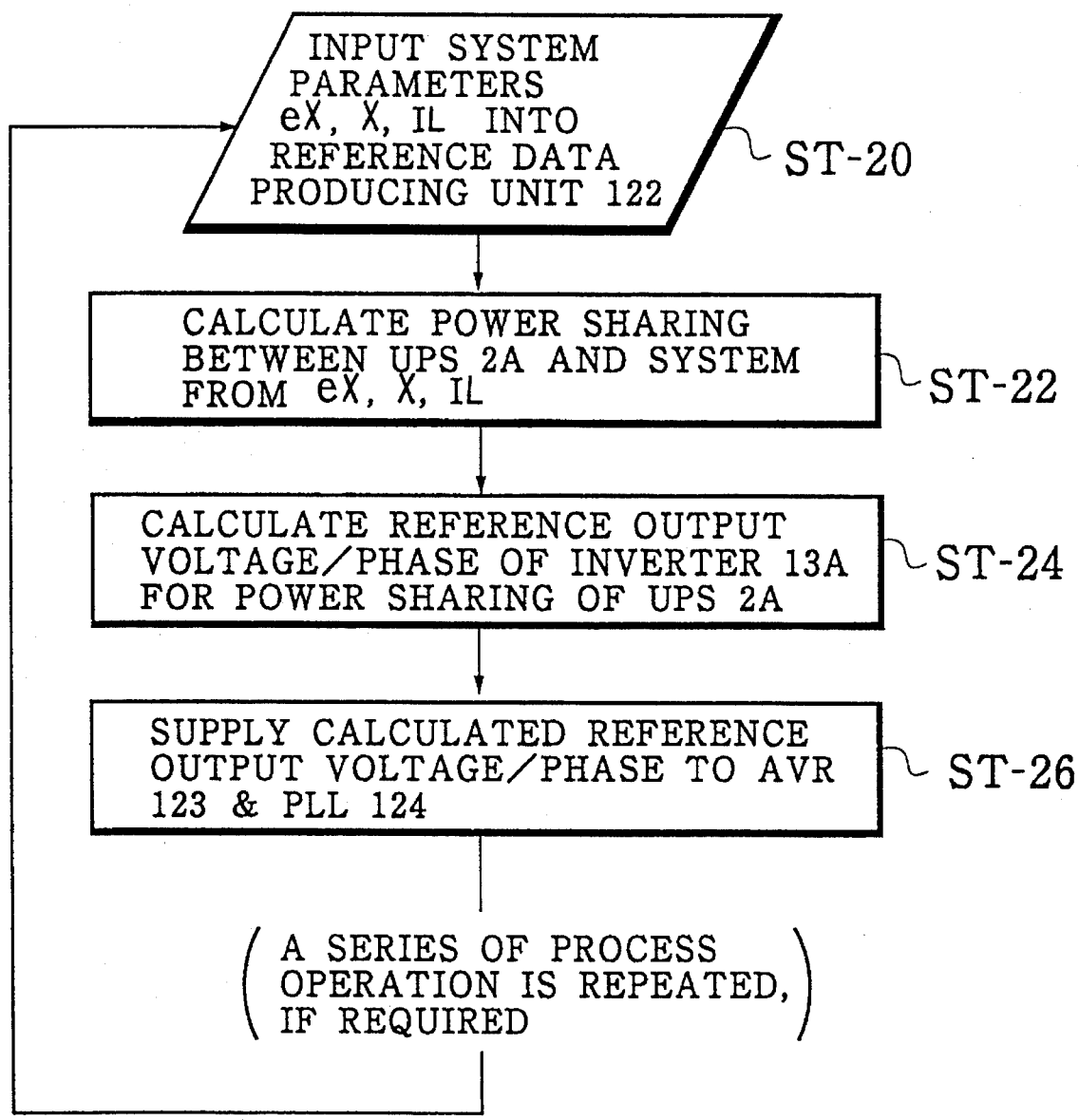
FIG. 4 is a flow chart for explaining operations of the reference data producing unit 122 employed in the first power inverting system.

Now, at a first step ST-20 of FIG. 4, the above-calculated system parameters eX, X, IL are inputted into the reference data producing unit 122. Then, the power sharing between the UPS 2A and the power inverting system is calculated based upon these parameters eX, X, IL in step ST-22. Another calculation is performed so as to obtain the reference output voltage and also the reference output phase of the inverter 13A for the sake of the power sharing of the UPS 2A at the next step ST-24. These calculated reference output voltage/phase data correspond to the optimum controlling data. Accordingly, the three unknown parameters eX, X, IL can be obtained. Thereafter, these calculated parameters eX, X, IL are supplied to the reference data producing unit 122 (will be continued to an operation flow of FIG. 4) in a step ST-19. If required, a series of above process operation is repeated at a predetermined time interval.

Subsequently, these calculated reference output voltage/current data (optimum controlling data) are supplied to the voltage controller (AVR) 128 and the phase synchronization controller (PLL) 124, respectively, so that the UPS 2A can supply its optimum output power via the parallel-output bus line 18 to the load 12 without establishing the control signal communication with the existing UPS 2B (see FIG. 1).

Then, if required, a series of above process operation is repeated at a predetermined time interval.

ARRANGEMENT OF SECOND POWER INVERTING SYSTEM

Figure 5:
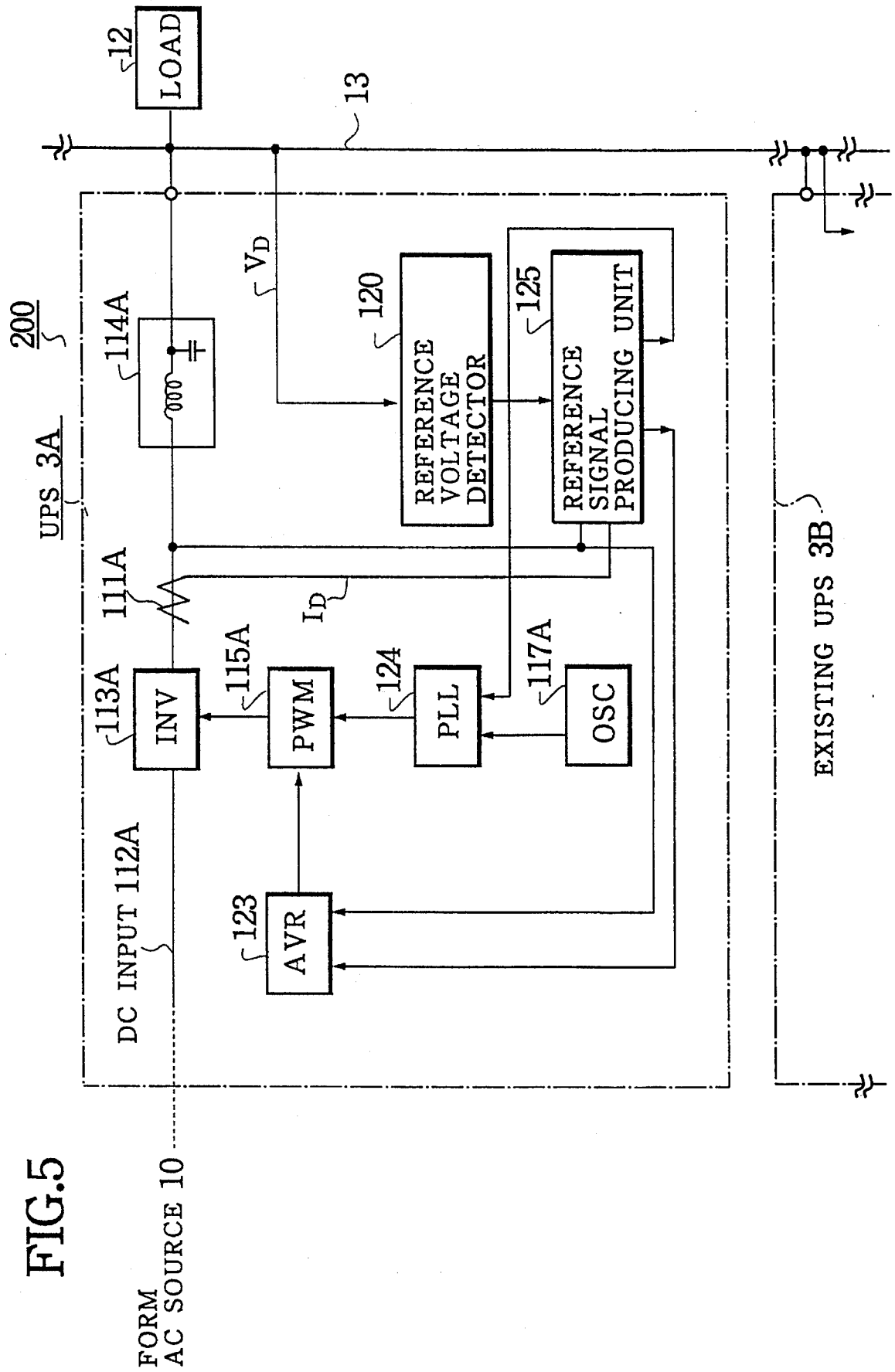
FIG. 5 is a schematic block diagram for showing an arrangement of a power inverting system 200 according to a second preferred embodiment of the invention.

FIG. 5 is a schematic block diagram for showing an arrangement of a power inverting system 200 according to a second preferred embodiment of the present invention. This second power inverting system 200 is accomplished based upon the above-described second basic idea.

It should be noted that the same reference numerals shown in FIG. 1 will be employed as those for denoting the circuit elements shown in FIG. 5, and also the converter 11A is omitted from FIG. 5.

In the UPS 3A shown in FIG. 5, DC power 112A derived from the converter (not shown in detail) is inverted into AC power by an inverter 113A, and thereafter filtered by an AC filter circuit 114A. The filtered AC power is supplied via the parallel-output bus line 13 to the load 12. At this time, a phase and a voltage waveform of the AC power (voltage) outputted from the inverter 113A are controlled as follows. That is, both an amplitude and a waveform of a voltage actually appearing on the bus line 12 are detected by a reference voltage detector 12 constructed of, for instance, a potential transformer (PT). The detected voltage signal "$V_D$" is inputted into a reference signal producing unit 125, so that a reference signal is produced from this producing unit 125. Since the phase of the output voltage from the inverter 113A is shifted by the AC filter 114A, the AC output current flowing through the AC filter 114A is detected by a current detector 111A, and then the detected current signal "$I_D$" is also supplied to this reference signal producing unit 125. Based upon this detected current signal "$I_D$", the detected voltage signal "$V_D$" from the reference voltage detector 120 is corrected in the reference signal producing unit 125 to obtain the above-described reference data (reference output signal). In this case, when the current flowing through the AC filter 114A is a delayed AC current, the reference output signal of the reference signal producing unit 125 is corrected to a phase leading direction with regard to the detected voltage signal "$V_D$" of the reference voltage detector 120. An amount of this correction is obtained by way of the vector method from the circuit constant of the AC filter 114A and the detected current signal "$I_D$" of the current detector 111A, and then the reference output signal obtained by correcting the detected voltage signal "$V_D$" of the reference voltage detector 120 is furnished to the reference signal producing unit 125.

On the other hand, if the voltage waveforms actually appearing on the bus line 13 are instantaneously changed, or the current flowing through the AC filter 114A is greatly varied, another AC voltage appearing at the input side of the AC filter 114A is also applied to the reference signal producing unit 125. Subsequently, the variations in the voltages and phases caused by the AC filter 114A, the inverter 113A, and a cable of the bus line 13 are instantaneously calculated in combination of the detected voltage signal "$V_D$" of the reference voltage detector 120 and the detected current signal "$I_D$" and also the above-described detected AC input voltage signal. Accordingly, a correction signal is produced and the reference signal may be produced from the reference signal producing unit 125 in response to this correction signal.

It should be noted the reference signal producing unit 125 may additionally have the following function. That is, to prevent the output current of the inverter 113A from becoming an over current, the phase of this output current is corrected in such a manner that the detected current signal "$I_D$" of the current detector 111A is reduced.

As previously explained, in accordance with the second power inverting system 200, the detected voltage signal "$V_D$" of the reference voltage detector 120 is corrected based upon the phase correction related to the phase shift in the AC filter 114A and the output current value of the inverter 113A so as to produce the reference output signal. In other words, this reference output signal derived from the reference signal producing unit 125 is connected so as to have a specific relationship for the phase and waveform of the voltage appearing on the bus line 13.

As a consequence, upon receipt of such a reference signal from the reference signal producing unit 125, the voltage controller (AVR) 123 controls via PWM 115A the AC output voltage from the inverter 113A to be fitted to a reference voltage of this reference signal given from the reference signal producing unit 125. Also, in response to the reference signal from the reference signal producing unit 125, a phase synchronization controller (PLL) 124 controls via the PWM 115A so that the phase of the output voltage from the inverter 113A is corrected to be fitted to a reference phase of this reference signal.

OPERATION OF SECOND POWER INVERTING SYSTEM

Referring now to a waveform chart of an AC voltage outputted from the inverter 113A, shown in FIG. 6, an operation of the second power inverting system 200 will be explained.

Figure 6:
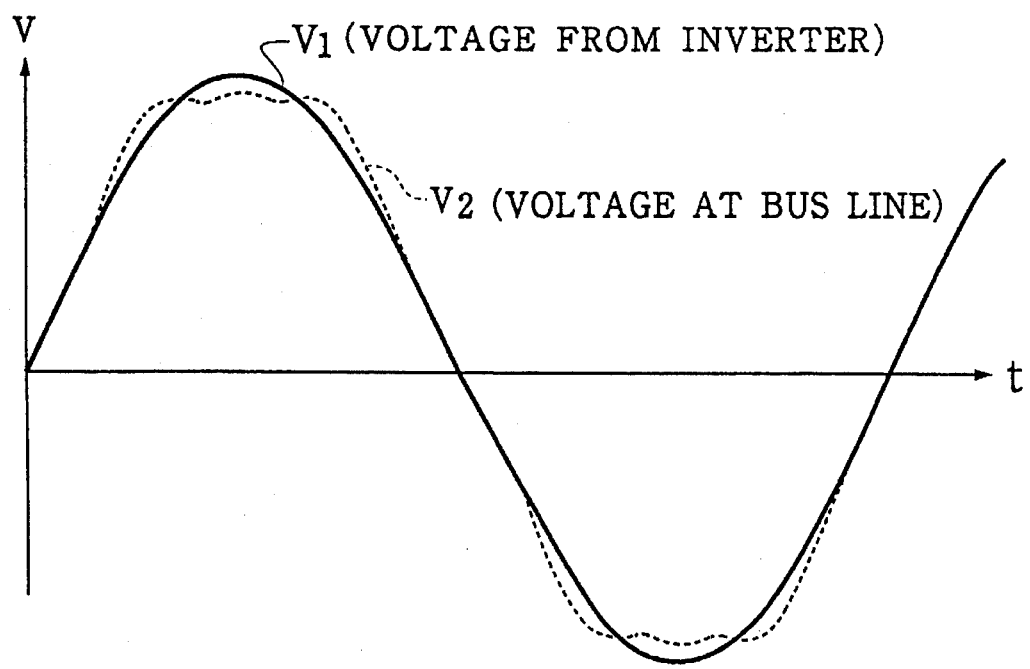
FIG. 6 shows the waveforms of the conventional power inverting system.

First, in FIG. 6, symbol "V1" represents the waveform of the AC voltage outputted from the conventional inverter (not shown), and symbol "V2" indicates the waveform of the AC voltage appearing on the conventional bus line. As previously stated, since the reference voltage is produced from the internal voltage generator of the UPS and this voltage has such a non-distorted sine waveform, even when the voltage "V2" appearing on the bus line contains distortion as shown in FIG. 6, the waveform of the voltage "V2" outputted from the inverter has no distortion. As a result, the above-described cross current flows due to the instantaneous voltage difference among this UPS and the other UPS.

To the contrary, as previously described in detail, the reference signal from the reference signal producing unit 125 is controlled so as to have a predetermined relationship (phase/waveform) with the actual waveform of the voltage appearing on the bus line in the second power inverting system 200. As a consequence, when the actual voltage appearing on the bus line 13 contains such a distorted waveform "V2", the waveform of the AC voltage outputted from the inverter 113A is also distorted in a similar form. Therefore, there is no instantaneous voltage difference between this inverter 113A and the bus line 13, so that no cross current flows via the bus line 13 into another UPS 3B (see FIG. 5).

In accordance with the particular merits of the second power inverting system 200, even when the circuit arrangement or the circuit system of this UPS 3A is different from that of another UPS 3B, such a problem of differences in the waveforms of the output voltages can be solved. The control signal communication with other inverter apparatuses can be minimized. Moreover, the conventional restrictions on the same rated capacity of the power inverting unit required to increase a total power capacity of the bus line can be also overcome.

DETAILED OPERATION OF REFERENCE VOLTAGE DETECTOR 120/REFERENCE SIGNAL PRODUCING UNIT 125

As previously explained, the reference voltage detector 120 simply detects the actual AC voltage appearing on the bus line 13. Accordingly, a potential transformer may be employed as this reference voltage detector 120.

FIG. 7 indicates a flow chart for explaining a process operation of the reference signal producing unit 125.

In step ST-30, both the current "$I_D$" of the inverter 113A and the waveform of the voltage "$V_D$" appearing on the bus line 13 are detected by the current detector 111A and the reference voltage detector 120, respectively. In the next step ST-32, the phase-delay caused by the AC filter 114A is calculated in the reference signal producing unit 125 based on the detected output current "$I_D$". Then, the reference signal is produced. Subsequently, this reference signal is supplied to the AVR 126 at a step ST-36, by which a waveform leading to the waveform of the voltage appearing on the bus line 13 by the calculated phase delay is outputted from the inverter 113A.

Similarly, if required, a series of the above steps are repeated at a predetermined time interval.

MODIFICATIONS

As apparent from the foregoing descriptions, the present invention is not limited only to the above-explained preferred embodiments, but may be changed, modified and substituted without departing from the technical scope and spirit of the present invention.

For example, although UPS devices are employed in the first and second power inverting systems 100 and 200 shown in FIGS. 1 and 5, other types of power inverting apparatuses may be utilized. Furthermore, such a power inverting system needs not be arranged by combining the converter 11A and the inverter 13A, but may be constructed by employing other different circuit arrangements. Also, instead of the battery 12A of FIG. 1, other energy sources such as a solar cell and a fuel battery may be utilized.

What is claimed is:

1. A power inverting method capable of parallel-connecting a plurality of power supply units to a common bus line, comprising the steps of:

entering a plurality of input commands for changing a parameter of an AC (alternating current) output voltage of a power inverter employed in one power supply unit;

detecting a variation in an AC output current of said one power supply unit when the AC output voltage of said power inverter is changed;

processing said variation in the AC output current to infer a desirable parameter required to share AC power which should be derived from said one power supply unit with respect to total output power capable of being supplied from said common bus line to a load; and controlling said one power supply unit to output a desirable voltage in response to said desirable parameter, whereby said power sharing operation for said one power supply unit is achieved independently of other power sharing operations for other power supply units.

2. A power inverting method as claimed in claim 1, wherein said step of entering a plurality of input commands for changing said parameter of said AC voltage comprises entering said input commands under respectively different voltages for inferring said desirable parameter in said processing step.

3. A power inverting system comprising:

a plurality of power supply units each having a power inverter and parallel-connected to a common bus line;

means for detecting a variation contained in an AC output current of one power supply unit when a command for changing an amplitude of an AC output voltage of the power inverter of said one power supply unit is issued;

means for processing said variation in the AC output current to infer a desirable parameter required to share AC power which should be derived from said one power supply unit with respect to total power output capable of being supplied from said common bus line to a load; and means for controlling said one power supply unit to output a desirable voltage in response to said desirable parameter, whereby said power sharing operation for said one power supply unit is achieved independently of other power sharing operations for other power supply units.

4. A power inverting system as claimed in claim 3, further comprising:

a battery coupled to an input side of said power inverter and capable of supplying DC power to said power inverter when an AC power supply by a main power source is interrupted, whereby said power inverting system functions as an uninterrupted power supply system.

5. A power inverting system as claimed in claim 4, wherein said battery is a rechargeable battery.

6. A power inverting system as claimed in claim 4, wherein said battery is a solar cell.

7. A power inverting system as claimed in claim 4, wherein said battery is a fuel battery.

8. A power inverting system as claimed in claim 3, wherein said detecting means is arranged by a current transformer for detecting said AC output current of said one power supply unit.

9. A power inverting system as claimed in claim 3, wherein said processing means includes:

a system parameter calculating unit for calculating a parameter of said power inverting system by processing said variation contained in the AC output current to obtain system parameter inferred data; and a reference data producing unit for producing reference data containing voltage data, as said desirable parameter, in response to said system parameter inferred data.

10. A power inverting system as claimed in claim 9, wherein said controlling means includes at least:

a voltage controller for controlling an amplitude of said AC output voltage of said power inverter in response to said voltage data of the reference data; and a phase controller for controlling a phase of said AC output voltage derived from the power inverter in response to said voltage data of the reference data.

11. A power inverting system as claimed in claim 10, wherein said controlling means further includes:

an oscillator for oscillating a reference oscillating signal to be supplied to said phase controller functioning as a phase-locked loop circuit; and a pulse width modulation control circuit for controlling said power inverter in a pulse-width modulation mode under control of said voltage controller and said phase controller.

12. A power inverting method capable of parallel-connecting a plurality of power supply units to a common bus line, comprising the steps of:

entering a plurality of input commands for changing an amplitude of an AC (alternating current) output voltage of a power inverter employed in one power supply unit;

detecting a variation in an AC output current of said one power supply unit when the amplitude of said AC output voltage of said power inverter is changed;

processing said variation in the AC output current to infer a desirable parameter required to share AC power which should be derived from said one power supply unit with respect to total output power capable of being supplied from said common bus line to a load; and controlling said one power supply unit to output a desirable voltage in response to said desirable parameter, whereby said power sharing operation for said one power supply unit is achieved independently of other power sharing operations for other power supply units.

13. A power inverting method capable of parallel-connecting a plurality of power supply units to a common bus line, comprising the steps of:

entering a plurality of input commands for changing a phase angle of an AC (alternating current) output voltage of a power inverter employed in one power supply unit;

detecting a variation in an AC output current of said one power supply unit when the phase of said AC output voltage of said power inverter is changed;

processing said variation in the AC output current to infer a desirable parameter required to share AC power which should be derived from said one power supply unit with respect to total output power capable of being supplied from said common bus line to a load; and controlling said one power supply unit to output a desirable voltage in response to said desirable parameter, whereby said power sharing operation for said one power supply unit is achieved independently of other power sharing operations for other power supply units.

* * * * *